United States Patent [19]

Bloom et al.

[11] 4,193,847
[45] Mar. 18, 1980

[54] METHOD OF ELECTRODEPOSITION

[75] Inventors: Stanley M. Bloom, Waban; Arnold Hoffman, Brookline; Kenneth S. Norland, Belmont, all of Mass.

[73] Assignee: Polaroid Corporation, Cambridge, Mass.

[21] Appl. No.: 939,846

[22] Filed: Sep. 5, 1978

[51] Int. Cl.² .......... C25D 5/02; C25D 5/06; C25D 5/56
[52] U.S. Cl. .................................. 204/15; 204/2.1
[58] Field of Search .............................. 204/2.1, 15

[56] References Cited

U.S. PATENT DOCUMENTS

| | | | |
|---|---|---|---|
| 936,472 | 10/1909 | Pfanhauser | 204/206 |
| 2,694,100 | 11/1954 | Zahn | 429/245 X |
| 2,820,077 | 1/1958 | Salauze | 429/222 X |
| 3,024,296 | 3/1962 | Adler | 429/217 X |
| 3,160,577 | 12/1964 | Nolan, Jr. | 204/195 |
| 3,309,228 | 3/1967 | Dodson et al. | 429/225 X |
| 3,326,721 | 6/1967 | Henderson et al. | 204/50 X |
| 3,328,272 | 6/1967 | Sandman et al. | 204/15 |
| 3,536,594 | 10/1970 | Pritchard | 204/27 |
| 4,010,083 | 3/1977 | Bakker et al. | 204/224 R |

FOREIGN PATENT DOCUMENTS 1415913  12/1975  United Kingdom ............... 204/13

Primary Examiner—T. M. Tufariello
Attorney, Agent, or Firm—John W. Ericson

[57] ABSTRACT

An electrode material is electrodeposited on a conductive substrate by contacting a first surface of the substrate with an electrolyte, establishing a vacuum at predetermined areas of the substrate opposite the surface containing the electrolyte, and causing a current flow in the areas of the conductive substrate where the vacuum has been established. Apparatus for carrying out the method is also disclosed.

9 Claims, 8 Drawing Figures

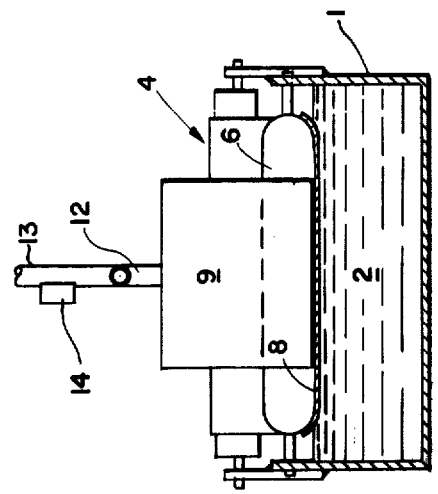
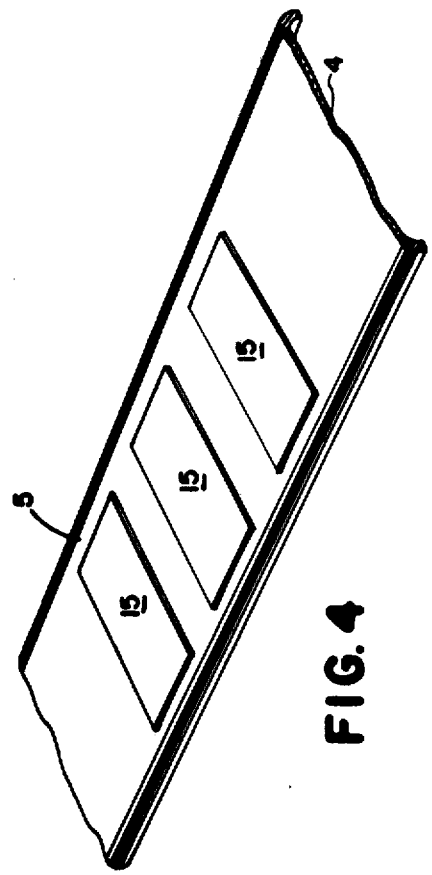
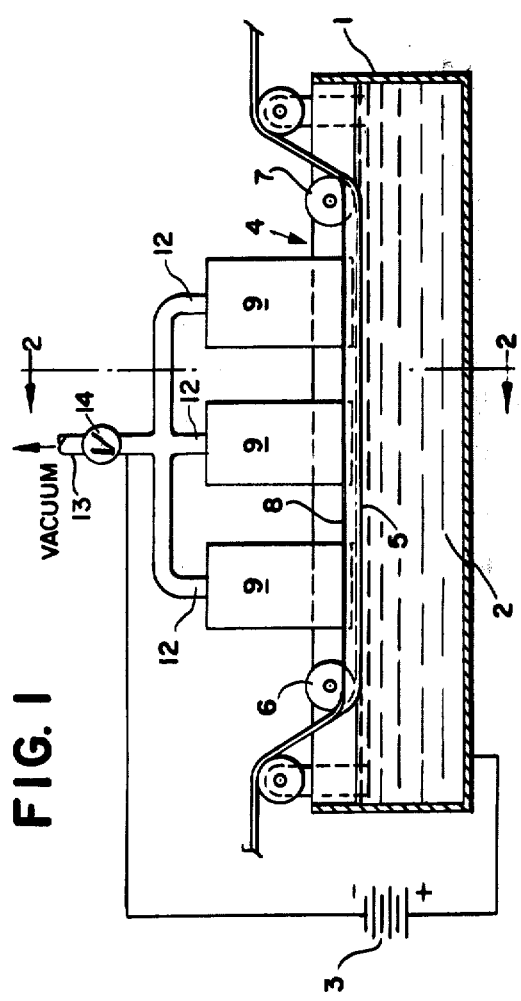
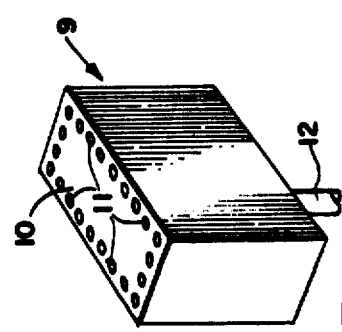

4,193,847

METHOD OF ELECTRODEPOSITION

BACKGROUND OF THE INVENTION

A number of batteries employ electrodes in the form of a thin layer of electrode active material in contact with a conductive substrate which acts as a means to convey current to the electrode or as a current collector. The conductive substrates include a variety of materials such as metals as exemplified by a thin aluminum sheet or foil, or conductive plastics as exemplified by Condulon, a vinyl resin containing sufficient carbon black to be highly conductive. Contact between the electrode material and the conductive substrate is established in a variety of ways including physical contact and by depositing or adhering the electrode active material on the substrate. Similarly, a variety of methods exist for establishing the contact such as by vacuum depositing the electrode active material on the substrate or by electroplating the electrode material on the substrate.

It is the object of this invention to provide a new and facile method of electrodepositing an electrode active material on a conductive substrate in predetermined areas having a substantially sharp demarcation so as to produce laminar electrodes of preselected shape for use in flat laminar batteries or cylindrical batteries such as "D" cells. Another object of the invention is to provide a new apparatus which can be employed in effecting the method of the present invention. These and other objects of the invention will become apparent to those skilled in the art from the following detailed description in conjunction with the accompanying drawings.

In the drawings,

FIG. 1 is a schematic cross section of a first apparatus which can be used in carrying out the method of the invention;

FIG. 2 is a cross section of the apparatus of FIG. 1 as seen essentially along the lines 2—2;

FIG. 3 is a plan view of a vacuum chamber or chuck which can be used in the apparatus of FIG. 1;

FIG. 4 is a plan view of a product of the process using the apparatus of FIG. 1;

SUMMARY OF THE INVENTION

Figure 5:
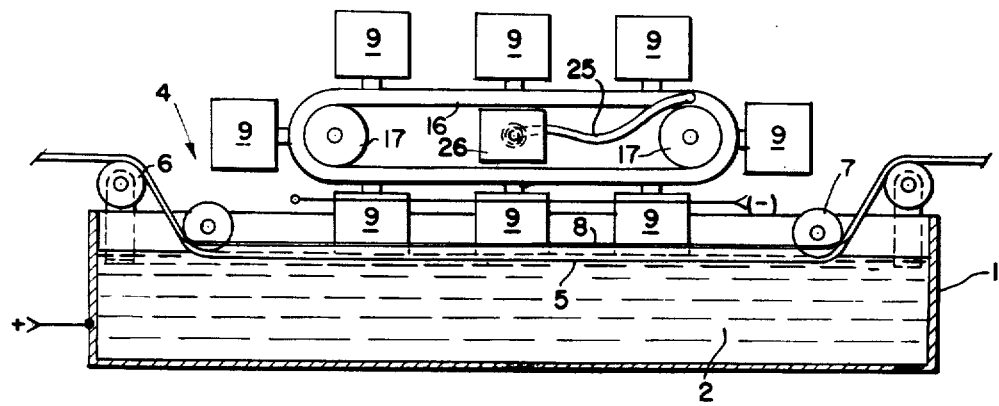
FIG. 5 is a schematic cross section of a second apparatus which can be used to effect the method of the invention in a continuous fashion.

This invention relates to a method of electrodepositing an electrode material on a conductive substrate and the apparatus used to carry out the method. More particularly, the method involves contacting a first surface of the substrate with an electrolyte from which the electrode active material is electrodepositable, establishing a vacuum at predetermined areas of the substrate opposite the surface contacting the electrolyte and causing current to flow through said predetermined areas thereby resulting in the electrodepositing of the electrode active material in the preselected areas. The apparatus includes a container for a quantity of electrolyte, means to position a conductive substrate within the container, and means to establish a vacuum at predetermined areas of the conductive substrate.

DESCRIPTION OF THE INVENTION

The apparatus shown in FIGS. 1 and 2 is adapted to perform the process of the present invention in a batch type procedure. The apparatus includes a container or tank 1 which holds a quantity of electrolyte 2 from which the electrode material is electrodepositable. The positive side of a source of electrical energy 3 is connected to the container 1 through any suitable means. The tank 1 can contain an electrode or, alternatively, can be constructed of a conductive material so that the walls and/or bottom of tank 1 acts as the electrode.

A conductive substrate 4 is positioned within the tank 1 such that a first side 5 of the substrate 4 contacts the electrolyte 2. In the embodiment shown, the substrate 4 is in the form of a web of Condulon, a conductive polymeric substrate which is guided into the tank 1 by positioning roller 6 and out of the tank 1 by a second positioning roller 7. Care is taken so that electrolyte 2 does not come into contact with the side 8 of the web 4 opposite the first side 5. One method of keeping the side 8 free of contact with the electrolyte 2 is shown in FIG. 2, where the sides of the strip 4 extend upwardly and outwardly of the tank 1. Other methods of maintaining the isolation can also be utilized.

Positioned at preselected areas of the second surface 8 of the web 4 are electrically conductive vacuum electrode chucks 9. One typical configuration of a suitable chuck 9 is shown in FIG. 3. Thus, the electrode chuck 9 can be a solid sided rectangular metal box, one face 10 of which contains a plurality of apertures 11. The electrode chuck 9 is connected to a source of vacuum through a conduit 12 which has its junction with the chuck 9 at any of the faces thereof other than the face 10.

The geometry of the chuck 9 and the positioning of the apertures 11 can take any desired form. Thus, although the chuck 9 in FIG. 3 is shown to be a rectangular box, it could also be cylindrical or any other desired shape. Similarly, although the apertures 11 are shown in FIG. 3 to be positioned along the edges of the parallel sides of the face 10, any desired configuration of the apertures 11 can be employed. A larger number of smaller apertures 11 is favored over a smaller number of larger holes. The configuration of the face 10 will determine the area of the first side 5 of the strip 4 at which the electrode active material is deposited.

In FIG. 1, three chucks 9 are shown. The conduits 12 from the electrode chucks 9 are connected to a common conduit 13. The conduit 13 is connected to a source of vacuum (not shown), and contains a shutoff valve 14 therein. Other arrangements for establishing a vacuum in the chuck 9 can also be adopted such as, for example, by conducting each of the individual conduits 12 directly to a source of vacuum.

The second side 8 of the strip 4 is connected to the negative side of the source of current 3. This can be effected in any convenient fashion. For example, the conduits 12 and 13 and the chucks 9 can be constructed of a conductive material, such as copper, so as to form a continuous electrical path from the second side 8 to the negative side of the battery 3.

In operation, a suitable electrolyte 2 such as an aqueous solution of cadmium chloride in liquid or gelled form is introduced into tank 1. A strip of conductive plastic is fed into and out of the tank 1 past the guide rollers 6 and 7. The chucks 9 are moved by any convenient means into contact with the second side 8 of the strip 4, the valve 14 is opened and a partial vacuum is established in the chucks 9. The degree of vacuum is not critical and any desired value can be established. Generally, only a slight vacuum need be pulled.

The conduit 13 is connected to the negative side of battery 3. The bottom of the tank 1, which in this case is constructed of a conductive metal, is connected to the positive side of the battery 3. Electrodeposition is allowed to proceed for a time appropriate to the deposit of a desired thickness, which can vary from as little as a strike of the electrode active material to a thickness as great as about 3 mils or more. In the electrodeposition of cadmium from an aqueous cadmium chloride electrolyte, an electroplating time of about 0.5–0.75 hour is generally sufficient to provide an electrodeposit of about 0.3 to about 1.0 mil in thickness.

Upon completion of the electrodeposition, the battery 3 is disconnected, atmospheric pressure is reestablished in the chucks 9, the valve 14 is closed and the chucks 9 are removed from contact with the second surface 8 of the strip 4. The strip 4 is then removed from the tank 1 for further processing, such as washing and drying.

The resulting product is shown in FIG. 4. On the first side 5 of the strip 4, flat laminar areas 15 of electrodeposited cadmium have been produced. The configuration of the areas 15 will be substantially the same as the configuration of the face 10 of the chuck 9. Although it is not desired to be limited to theory, it is believed that the partial vacuum established provides an area of sharply decreased resistance to electrical flow in the region defined by the face 10 of the chuck 9. As a result, the sides of the areas 15 of the electrodeposited electrode active material are rather sharply defined thereby providing patches of the electrode active material on the conductive strip 4.

An apparatus adapted to a continuous process of electrodepositing the electrode active material on the conductive substrate is shown in FIG. 5. As in the previous embodiment, the tank 1 contains a quantity of electrolyte 2. The electroconductive substrate 4 is introduced into the tank 1 past a guide roller 6 and out of the tank 1 past a guide roller 7. The first side 5 of the strip 4 is maintained in contact with the electrolyte 2, and the second side 8 is maintained out of contact with the electrolyte 2. The second side 8 is maintained out of contact with the electrolyte in order to prevent the formation of an electrodeposit in the apertures 11 of the vacuum chuck which would result in the clogging or closing of those apertures and the attendant loss of vacuum, as well as the contamination of the chuck with toxic cadmium.

Figure 6:
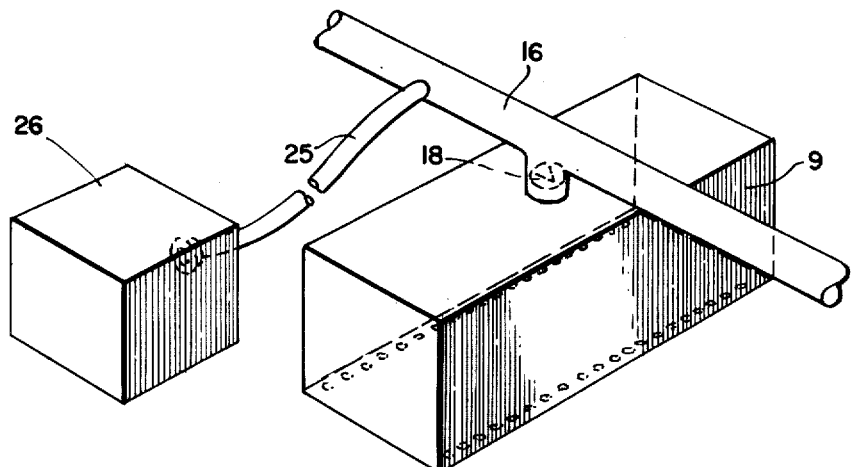
FIG. 6 is a plan view of a vacuum container or chuck employable in the apparatus of FIG. 5 and its connection to a source of vacuum.

In the embodiment of FIG. 5, a plurality of vacuum chucks 9 are connected to an endless flexible tube 16, of polyurethane, for example, which rotates around a pair of guide rollers 17. The hollow tube 16 can serve as a vacuum conduit for all of the chucks 9 and, as shown in FIG. 6, the connection between the tube 16 and each chuck 9 can contain a valve 18 for isolating the individual chuck from the tube 16. As suggested in FIG. 6, the tube 16 can be connected over a flexible hose 25 to a fixed vacuum source, such as an aspirator or the like. An electrical connection to the negative side of a battery (not shown) can be effected by a contactor 27, shown in FIG. 5, contacting the metal chucks 9 over the portion of their path in which they engage the web 4. Electrical connection to the positive side of the battery can be accomplished in the same manner as shown in and described above with respect to FIG. 1.

In operation, the strip 4 is continuously introduced and withdrawn from the tank 1 by any suitable means at a speed such that the time of contact of the side 5 of the strip 4 with the electrolyte 2 is appropriate to the desired thickness of electrodeposited material. The tube 16 is rotated by the rollers 17 at a speed such that the chucks 9 are maintained in appropriate registry with the side 8 of the strip 4 as the strip 4 moves through the tank 1. The valve 18 of each individual chuck 9 is normally maintained closed so as to isolate the chuck 9 from the vacuum in the tube 16. The valve 18 is caused to open and thereby establish a vacuum in the chuck 9 when the chuck 9 is in appropriate registry with the side 8 of the strip 4. The opening and closing of the valves 18 can be controlled by a timing circuit (not shown) or any other appropriate means. A section of the continuous strip 4 after withdrawal from the housing 1 will have the same configuration as shown in FIG. 4 provided, of course, that the face of the chuck 9 contacting the second side 8 has the same configuration as shown in FIG. 3.

Figure 7:
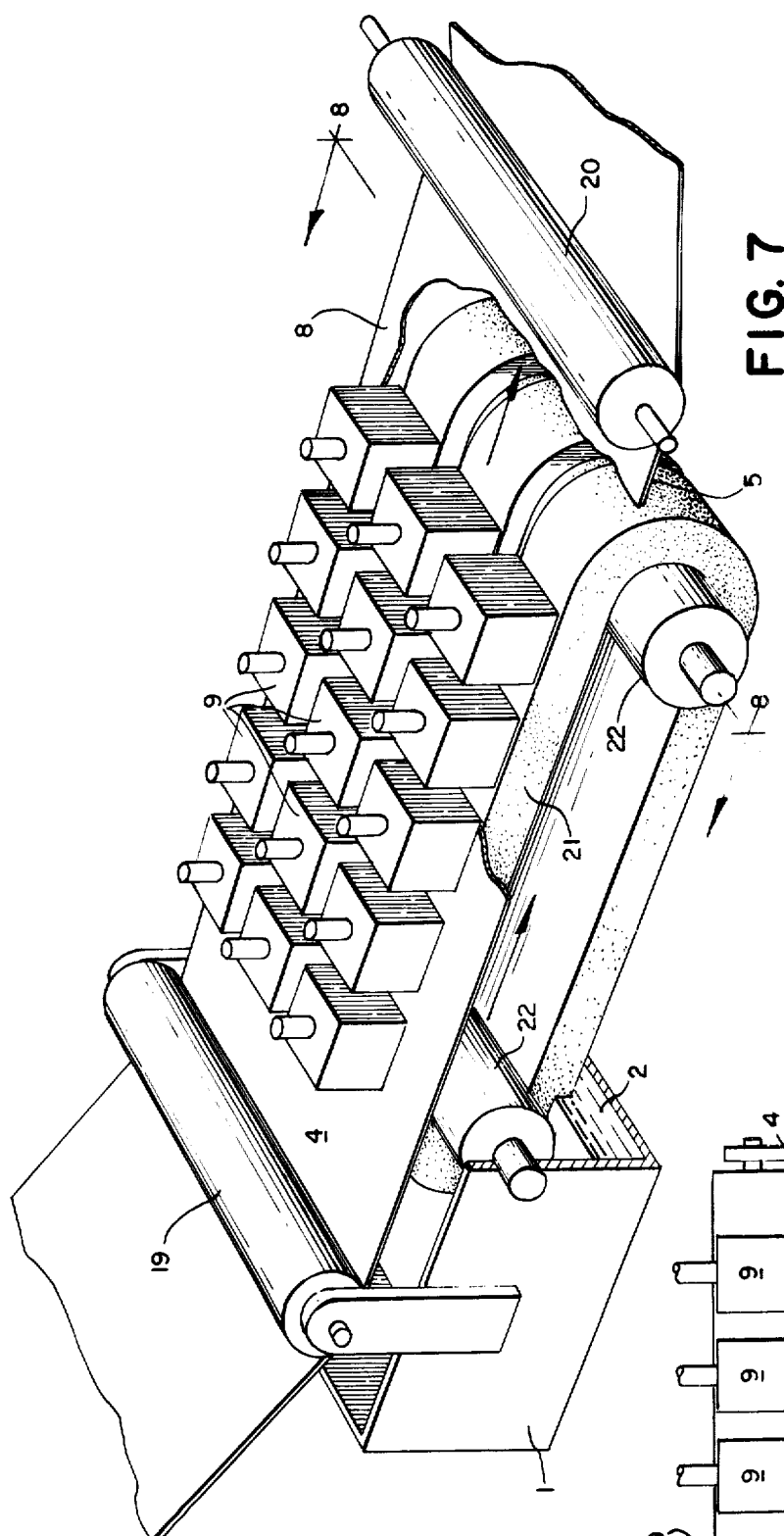
FIG. 7 is a schematic plan view of a third embodiment of the invention.
Figure 8:
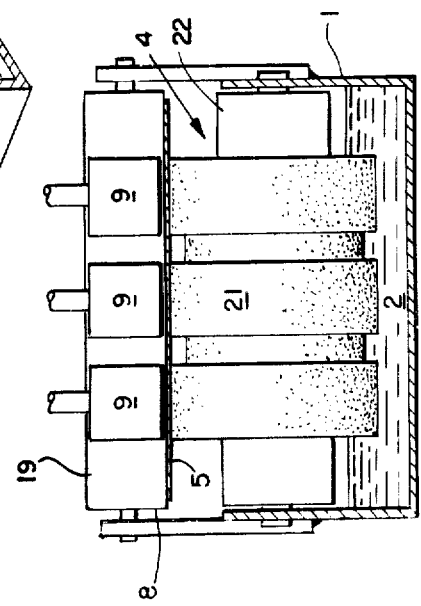
FIG. 8 is a cross section along the lines 8—8 in FIG. 7.

A further embodiment of the present invention is shown in FIGS. 7 and 8. In this case, the strip 4 of conductive material is fed from a supply roll 19 to a take-up roll 20 in the direction shown by the arrow. A plurality of vacuum chucks 9 are contacted with the second side 8 of the strip 4 but the first side 5 is not directly contacted with the liquid electrolyte 2. Instead, an endless belt of a sponge or other sorbent material 21 carried by rollers 22 is employed. A portion of the sponge belt 21 dips into the electrolyte 2 and another portion of the sponge belt 21 contacts the first side 5 of the strip 4. If the sorption characteristics of the sponge belt 21 are sufficient, the belt 21 can be stationary. Alternatively, if desired, the belt 21 can be rotated in the direction shown by the arrow, wiping the surface of the strip 4 as the strip is held stationary during the electrodeposition process. In this embodiment, electrical connection to the positive side of a battery can be accomplished by employing an electroconductive material as the material of construction of the rollers 22 and by connecting the positive pole of the battery to the rollers. As shown in FIG. 8, the cross section of the sponge belt 21 can be adapted to encourage electrodeposition in the desired areas and to minimize electrodeposition in the areas of strip 4 where it is not desired to have any electrode material. Thus, the surface of the belt 21 contacts the first surface 5 of strip 4 only in those areas directly adjacent chucks 9.

Various changes and modifications can be made in the process and apparatus of this invention without departing from the spirit and scope thereof. The various embodiments disclosed herein were for the purpose of further illustrating the invention but were not intended to limit it.

Having thus described the invention, what is claimed is:

1. A method of electrodepositing a series of spaced patches of electrode active material on a conductive plastic substrate which comprises contacting at least a portion of a first surface of said substrate with an electrolyte from which said material is electrodepositable, establishing a vacuum at a series of spaced predetermined areas of said substrate on a second surface opposite said first surface and in regions spaced from the borders of said substrate and lying within the borders of and opposite said portion, maintaining said predetermined areas of said second surface out of contact with said electrolyte, and causing current to flow through said preselected areas and said electrolyte to deposit said material on said first surface in said preselected areas.

2. The method of claim 1 wherein said vacuum is established at said predetermined areas by contacting a face of a vacuum chamber with said substrate opposite said first surface, said face of said vacuum chamber having a plurality of apertures.

3. The method of claim 2 wherein said current is caused to flow through said vacuum chamber.

4. The method of claim 1 wherein said electrolyte is carried by an electrolyte sorbtive material which contacts only a portion of said first surface.

5. The method of claim 1 wherein said electrode active material is cadmium, and said electrolyte comprises aqueous cadmium chloride.

6. The method of forming discrete metallic electrode deposits on spaced regions of a first surface of a web of conductive plastic material, comprising the steps of contacting a region of said first surface of said web larger than and including said spaced regions with an electrolyte containing cations of the metal to the deposited, contacting a second surface of said web opposite said first surface with spaced porous electrodes, reducing the pressure behind said electrodes to hold said web in contact with said electrodes, and passing electrical current through said electrolyte, said web and said electrodes to form spaced metal deposits on said first surface.

7. The method of claim 6, in which said electrolyte is contained in a sponge.

8. The method of claim 7, in which said sponge comprises an endless belt partially immersed in a bath of said electrolyte and extending out of said electrolyte into contact with said web, and further comprising the steps of holding said web stationary while moving said sponge to continuously wipe said web with fresh electrolyte while replenishing the electrolyte in the sponge from said bath.

9. A method of treating a conductive plastic substrate which comprises contacting a first area comprising at least a portion of a first surface of said substrate with an electrolyte containing cations of a metal to be deposited, establishing a vacuum at a predetermined second area of said substrate opposite said first surface, said second area being smaller than said first area and being within the borders of said first area and causing current to flow through said preselected area and said electrolyte to deposit metal on said first surface in a region opposite to and conforming with said second area.

* * * * *